United States Patent [19]
Klingler et al.

[11] Patent Number: 5,836,219
[45] Date of Patent: Nov. 17, 1998

[54] GEAR-CASE ARRANGEMENT FOR A MOTOR-GEAR DRIVE UNIT, IN PARTICULAR FOR AUTOMOBILE WINDOW LIFTERS OR THE LIKE

[75] Inventors: Peter Klingler, Neubrunn; Thomas Luckas, Kuermach, both of Germany

[73] Assignee: Siemens Aktiengesellshcaft, Munich, Germany

[21] Appl. No.: 701,951

[22] Filed: Aug. 23, 1996

[30]     Foreign Application Priority Data

Aug. 25, 1995 [DE] Germany ................ 295 13 701 U

[51] Int. Cl.⁶ ......................................... F16H 57/02
[52] U.S. Cl. ................................... 74/606 R; 74/425
[58] Field of Search .............................. 74/89.2, 89.22, 74/411, 505, 606 R, 425; 49/349, 352

[56]     References Cited

U.S. PATENT DOCUMENTS

| | | | |
|---|---|---|---|
| 4,191,060 | 3/1980 | Sessa | 74/89.22 |
| 4,216,624 | 8/1980 | Blankenburg et al. | 49/352 |
| 4,314,692 | 2/1982 | Brauer et al. | 49/349 |
| 4,471,251 | 9/1984 | Yamashita | 49/349 |
| 4,534,233 | 8/1985 | Hamaguchi | 74/89.2 |
| 4,770,056 | 9/1988 | Becker et al. | 74/505 |
| 4,821,589 | 4/1989 | Fukumoto et al. | 74/89.22 |
| 4,895,048 | 1/1990 | Key et al. | 74/625 |
| 5,095,766 | 3/1992 | Knappe et al. | 74/89.22 |

FOREIGN PATENT DOCUMENTS

| | | |
|---|---|---|
| 0681359 | 11/1995 | European Pat. Off. . |
| 9206269 | 10/1993 | Germany . |
| 9311529 | 12/1993 | Germany . |

*Primary Examiner*—Vinh T. Luong
*Attorney, Agent, or Firm*—Sughrue, Mion, Zinn, Macpeak & Seas, PLLC

[57]     ABSTRACT

In a motor-gear drive unit, particularly for automobile window lifters and the like, a moisture-tight closure of the gear case (2) is provided by a gear case cover (4). The cover (4) is preferably injection-molded from plastic and can be connected to the gear case (2) nonpositively by a press-fitted, insertable clamp fastening. Specifically, the clamp fastening takes the form of a peripheral web (4.1) capable of being pressed into a peripheral channel-like groove (2.2), where the peripheral web (4.1) and the peripheral channel-like groove (2.2) are provided, respectively, on either the case (2) or the cover (4). If the peripheral web (4.1) is provided on the cover (4), a peripheral scraping rib (4.11) is molded on the inside surface of the web (4.1). An elastic gasket layer (5) having a static sealing edge (5.1) is applied, e.g., injection-molded onto an outer surface of the peripheral web (4.1).

19 Claims, 4 Drawing Sheets

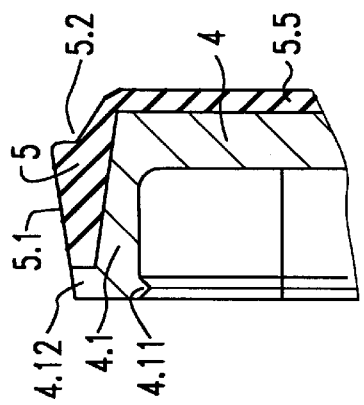
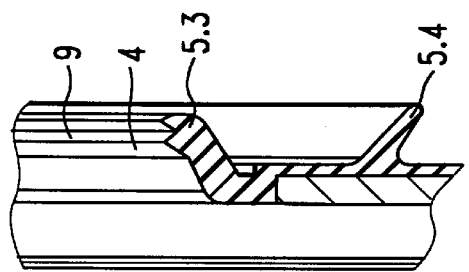
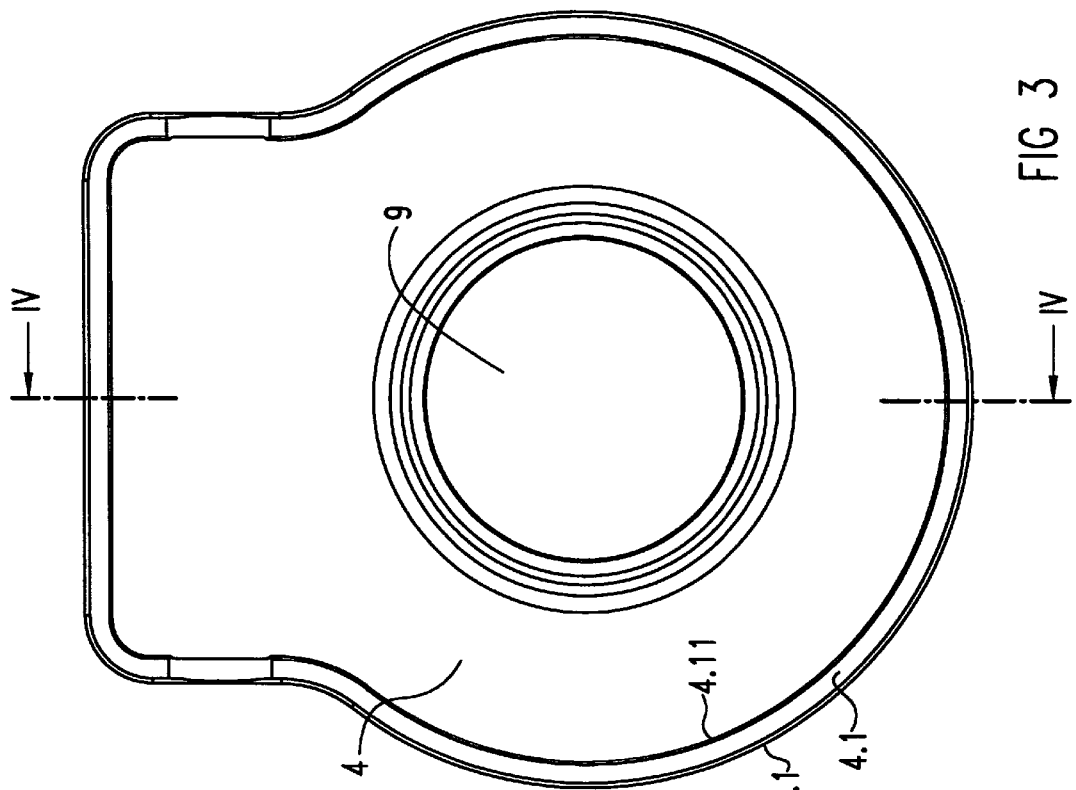
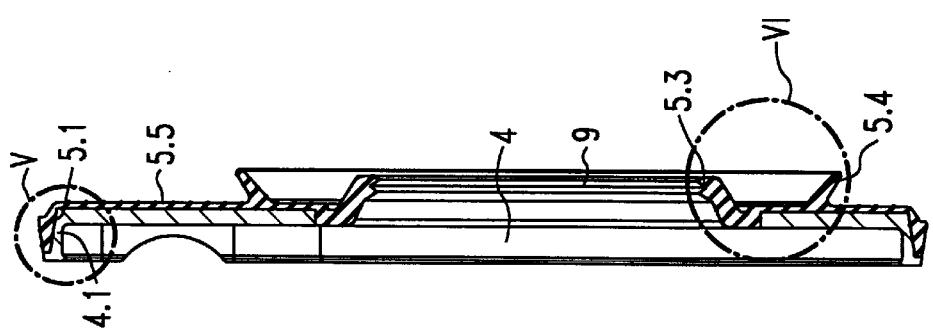

ing a motor-gear drive for an automobile window lifter, a sunroof or the like.

A drive unit having a gear case and a gear case cover that closes the gear case in a moisture-tight manner is known from DE-GM-93 11 529.6. According to the abovementioned reference, a gear case cover is screwed on the gear case, for achieving a moisture-tight closure of the gear case. The gear case cover has a static gasket in the form of a flat gasket injection-molded onto the cover and engaging around the outer edge of the gear case cover. The static gasket also has a molded-on sealing lip capable of being pressed in a sealing manner onto the gear case when the gear case cover comes to bear. In addition, the gear case cover has a dynamic gasket in the form of a sealing edge injection-molded onto the cover in a central orifice region that is provided for an outward-projecting driveshaft.

OBJECTS OF THE INVENTION

According to a first object of the present invention, a moisture-tight closure between the gear case and gear case cover should continue to be ensured. A further object of the invention is to additionally simplify the manufacture and assembly of the gear case arrangement in a way advantageous for mass production of a standard article.

SUMMARY OF THE INVENTION

In a motor-gear drive unit of the type initially recited, these and other objects are achieved, according to the invention, by means of the teachings of independent claims 1 and 15. Particularly advantageous aspects and embodiments of the invention are the subject matter of the dependent claims.

A motor-gear drive unit according to the invention includes a gear case and a gear case cover for covering and closing the gear case in a moisture-tight manner. The gear case cover is fashioned to be connected to the gear case through a press-fit, clamp-fastening closure. This type of nonpositive connection is obtained by means of an insertable clamp fastening in the form of a peripheral web that is capable of being pressed into a peripheral channel-shaped groove. The peripheral web is provided on either the gear case or the gear case cover, while the peripheral channel-shaped groove is provided on the other.

In order to achieve the moisture-tight closure of a gear case cover onto a gear case in accordance with the invention, there is no need for separate screw fastenings. The gear cover can be clamped firmly and in a sealed manner simply by pressing the peripheral web into a peripheral channel. The peripheral channel is advantageous also in that it can be incorporated simply into manufacturing and production techniques, particularly in the case of injection molding processes.

According to preferred embodiments of the invention, the peripheral web is pressed onto a side wall of the groove via a peripheral scraping rib. This scraping rib preferably extends perpendicularly to the direction of insertion. The peripheral web is further pressed against the other side wall of the groove via an elastic gasket support. The elastic gasket support is preferably injection-molded as a static sealing edge having a wedge-shaped cross-section onto a face of the peripheral web that is opposite the face on which the scraping rib is formed.

The preferred embodiments just described provide a good press fit of the peripheral web in the channel-shaped groove, even though assembly of the gear case cover and the gear case requires only slight insertion pressure. Moreover, the preferred embodiments provide a reliable, moisture-tight seal between the press-in peripheral web and the surrounding ring-like groove.

BRIEF DESCRIPTION OF DRAWINGS

The invention and further associated aspects and advantages of the invention are explained in greater detail below by means of diagrammatically represented, exemplary embodiments in the drawing, in which:

FIG. 3 shows an axial top view of that end face of the gear case cover which faces the inside of the gear case;

FIG. 4 shows the gear case cover according to FIG. 3 along the sectional line IV—IV;

FIG. 5 shows an enlarged detail of the outer edge of the gear case cover according to FIG. 4;

FIG. 6 shows an enlarged detail in the region of the radially inner part of the gear case cover according to FIG. 4.

DETAILED DESCRIPTION OF THE PREFERRED EMBODIMENTS

Figure 1:
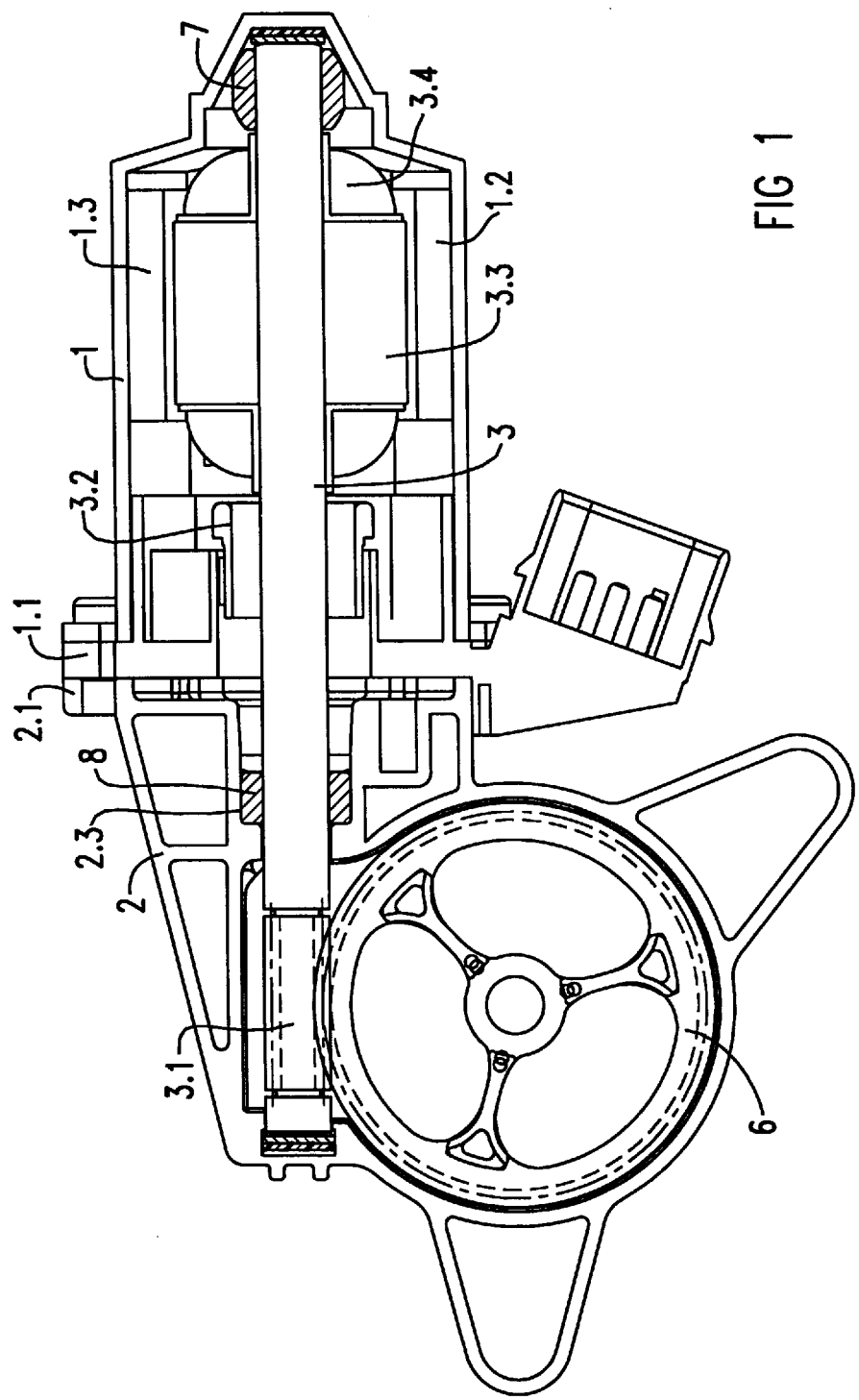
FIG. 1 shows an automobile window lifter drive in an axial longitudinal section.

FIG. 1 shows an axial longitudinal section through a motor-gear drive unit for an automobile window lifter drive with a pot-shaped motor housing 1. A gear case 2, injection-molded from plastic, is fastened to an end flange 1.1 of the motor housing 1 by means of a corresponding end flange 2.1.

A motor-gear shaft 3 is mounted within the motor housing 1 and the gear case 2. More particularly, a rightward extending end of the shaft 3 is mounted in a shaft bearing located on the motor housing side. The shaft bearing is preferably provided by a cup bearing 7. A middle shaft bearing, formed preferably as a cylindrical bearing 8, supports the shaft 3 on the gear case side, towards the left-hand side. The shaft 3, however, overhangs the cylindrical bearing 8 in the leftward direction, and thus has a free shaft end extending beyond the cylindrical bearing 8. This free shaft end is provided with a worm shaft 3.1, which meshes with an output-side worm wheel 6. Exciter magnets 1.2, 1.3 are mounted around the circumference of the pot-shaped motor housing 1. The right-hand portion of the motor-gear shaft 3, extending through the motor housing 1, engages with a rotor assembly 3.3. The rotor assembly 3.3., the details of which are not shown in greater detail, has a rotor winding 3.4 wound therein and is connected to a commutator 3.2.

Figure 2:
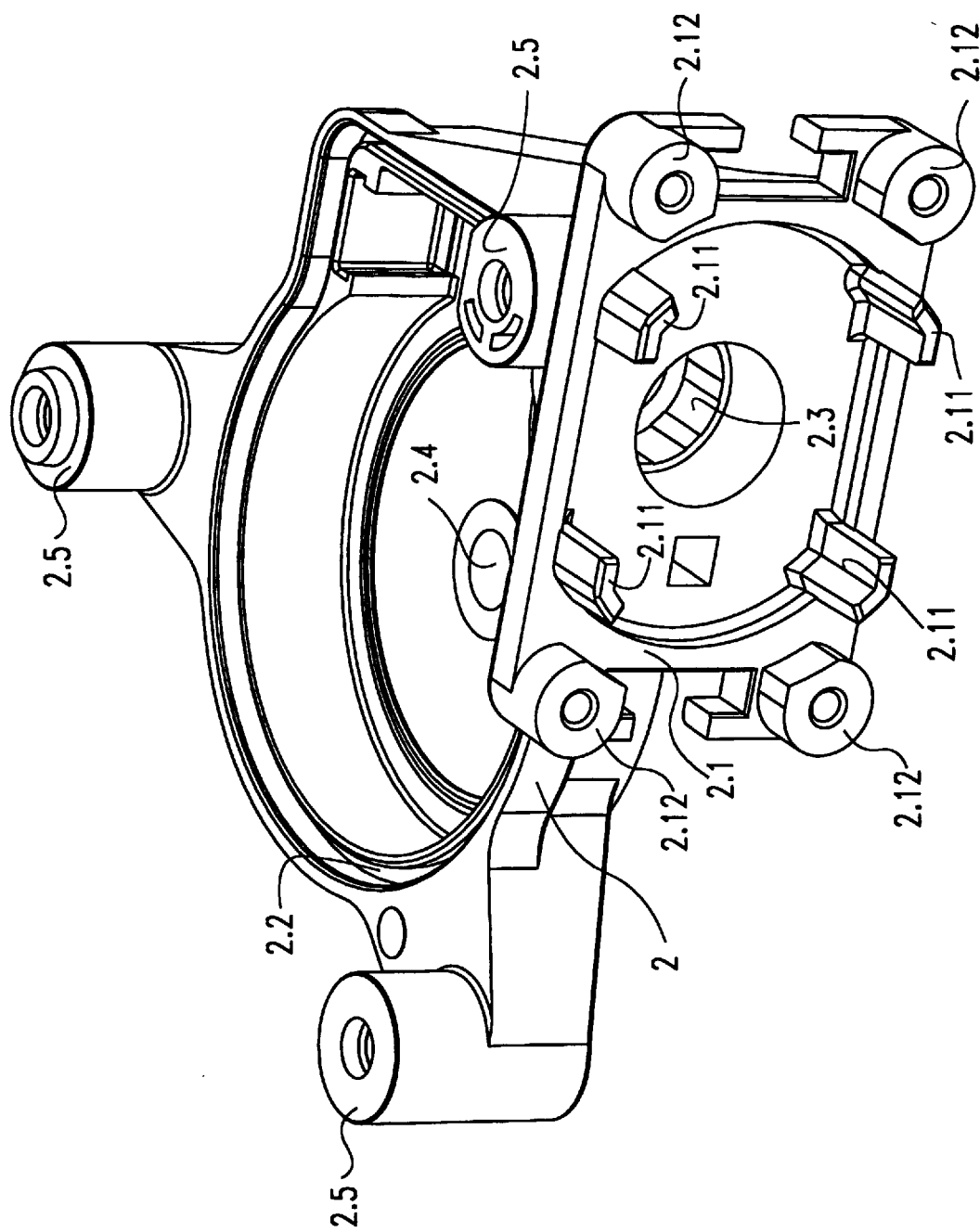
FIG. 2 shows a perspective representation of a gear case of the window lifter drive according to FIG. 1.

FIG. 2 is a perspective representation of the gear case 2, as yet unequipped and not yet closed in a moisture-tight manner. The gear case 2 is preferably injection-molded from plastic. Axially projecting guide webs 2.11 are injection-molded on the end flange 2.1, for facilitating the guided assembly of the motor housing 1. Also provided on the end flange 2.1 are fastening lugs 2.12, to which the motor housing 1 can be screwed by means of its end flange 1.1. The gear case 2 additionally has a receptacle 2.4, as well as further fastening lugs 2.5 located at various points around the periphery of the receptacle. The receptacle 2.4 is configured to support a worm wheel axle, and the worm wheel axle, in turn, has the worm wheel 6, illustrated in FIG. 1, arranged thereon. The cylindrical bearing 8 for mounting the motor-gear shaft 3 is pressed into and held in the bearing orifice 2.3.

Figure 7:
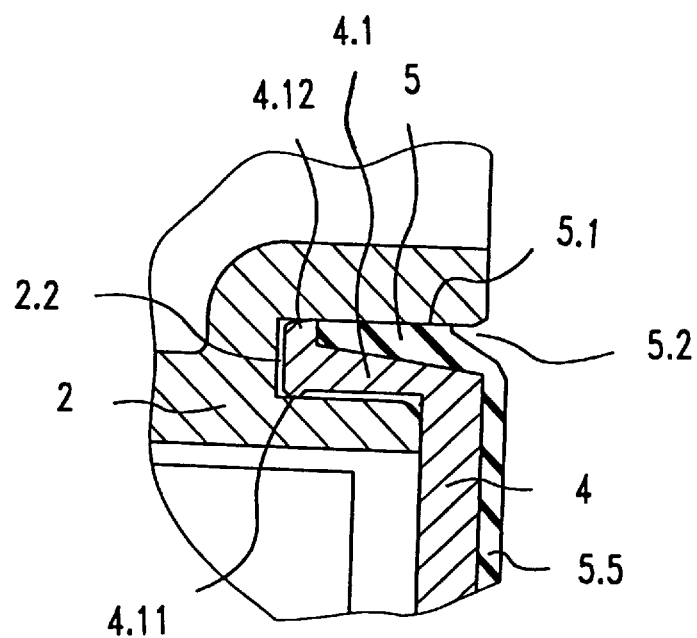
FIG. 7 shows the gear case cover according to FIG. 5 connected to the gear case.

The gear case 2 is covered and closed by means of a gear case cover 4. The gear case cover 4 is shown in more detail in FIGS. 3–6 and the gear case 2 covered and closed by the gear case cover 4 is shown in FIG. 7. For this purpose, a peripheral channel-like groove 2.2 is molded into the gear case 2. According to the invention, the gear case cover 4 can be pressed into this peripheral channel-like groove 2.2 with a corresponding peripheral web 4.1. The web 4.1 fits into the groove snugly and securely, so as to tightly seal the cover 4 to the case 2. The cover 4 and case 2 are thereby joined and held together in nonpositive fashion without the use of screws or the like.

To ensure a high holding force on the one hand, and nevertheless an easy press-in capability on the other hand, the peripheral web 4.1 has at least one peripheral scraping rib 4.11. As illustrated by the embodiment shown in FIGS. 3–5, the scraping rib 4.11 preferably runs along an inner wall of the peripheral web and extends perpendicularly to the direction of insertion, i.e., perpendicularly to the direction in which the cover 4 is moved while being inserted into the gear case 2 during the clamping operation. Once pressed into the gear case 2, the gear case cover 4 bears on the inner wall of the peripheral channel 2.2 via the scraping rib (or ribs) 4.11.

Particularly high sealing reliability can be guaranteed by applying an elastic gasket layer 5 to the outer wall of the peripheral web 4.1. This elastic gasket layer 5 then presses against the other side wall of the peripheral channel 2.2 when the cover 4 is secured to the gear case 2. The elastic gasket layer 5 is particularly advantageous if formed as a static sealing edge 5.1, which widens outward in a wedge-like manner such that its wall thickness increases in the direction extending away from the gear case 2. To facilitate manufacture and assembly, as well as for design-related reasons, the sealing edge 5.1 has a guide edge 4.12 engaged under it at its leading edge, which faces the direction of insertion. The guide edge 4.12 can be molded onto the inelastic web 4.1, and is preferably injection-molded from plastic. A radially set-back step, or shoulder, 5.2 is formed at the opposite, trailing end of the guide edge 4.12, i.e., at the portion of the guide edge 4.12 facing away from direction of insertion.

The gear case cover 4 is provided with a centric middle orifice 9, through which an output shaft (not shown), connected to the worm wheel 6, can extend out beyond the gear case cover 4. For sealing the gear case cover 4 relative to the output shaft, according to one embodiment of the invention, a dynamic sealing lip 5.3 is injection-molded onto the gear case cover 4. FIGS. 3, 4 and 6 depict such an embodiment by way of example, in which the sealing lip 5.3, which constitutes a radially inner part of the gear case cover, faces the insertion orifice 9 about the entire circumference of the orifice. Thus, when the output shaft is received by the insertion orifice and mounted in the gear case 2, the sealing lip 5.3 bears in a sealing manner on the outer circumference of the output shaft.

To provide yet another seal against moisture and the like, the gear case cover 4 has another, axially projecting static sealing lip 5.4 injection-molded onto its outer surface. The preferably circular static sealing lip 5.4, shown in FIGS. 4 and 6, seals the gear case cover 4 relative to a retaining wall on which the entire motor-gear drive unit is mounted. For example, the drive unit can be mounted by means of the further fastening lugs 2.5 on an intermediate wall in an automobile door. To provide further advantages in terms of manufacturing, the static sealing edge 5.1, the dynamic sealing lip 5.3 and, if appropriate, the static sealing lip 5.4 can be designed as one piece, together with a sealing layer 5.5 applied to the outer end face of the gear case cover 4.

What is claimed is:

1. A motor-gear drive unit, comprising:

a gear case; and a gear case cover for closing said gear case in a moisture-tight manner, wherein said gear case cover is fashioned to connect to said gear case nonpositively by means of a press-fit, clamp-fastening closure provided by a peripheral web inserted into a peripheral channel-shaped groove, said peripheral web and said peripheral channel-shaped groove being provided, respectively, on one and the other of said gear case and said gear case cover, and wherein said peripheral web bears on a side wall of said peripheral channel-shaped groove via a scraping rib.

2. The motor-gear drive unit as claimed in claim 1, wherein said motor-gear drive unit is an automobile window lifter drive.

3. The motor-gear drive unit as claimed in claim 1, wherein said scraping rib comprises at least one peripheral scraping rib extending transversely to a direction in which said peripheral web is inserted into said peripheral channel-shaped groove.

4. The motor-gear drive unit as claimed in claim 3, wherein a static sealing edge has a wedge-shaped cross-section widening with increasing depth of insertion between said peripheral web and a side wall of said peripheral channel-shaped groove.

5. The motor-gear drive unit as claimed in claim 4, wherein said static sealing edge is underhung, at its front insertion end, by a guide edge of said peripheral web and is set back radially at its rear insertion end by means of a shoulder.

6. The motor-gear drive unit as claimed in claim 4, wherein said scraping rib is molded onto an inner wall of said peripheral web, and said static sealing edge is applied to an outer wall of said peripheral web.

7. The motor-gear drive unit as claimed in claim 6, wherein said static sealing edge is a vulcanized or injection-molded sealing edge on the outer wall of said peripheral web.

8. The motor-gear drive unit as claimed in claim 1, wherein said peripheral web presses onto a side wall of said peripheral channel-shaped groove via an elastic static gasket layer.

9. A motor-gear drive unit, comprising:

a gear case; and a gear case cover for closing said gear case in a moisture-tight manner, wherein said gear case cover is fashioned to connect to said gear case nonpositively by means of a press-fit, clamp-fastening closure provided by a peripheral web inserted into a peripheral channel-shaped groove, said peripheral web and said peripheral channel-shaped groove being provided, respectively, on one and the other of said gear case and said gear case cover, and wherein said peripheral web presses onto a side wall of said peripheral channel-shaped groove via an elastic static gasket layer.

10. The motor-gear drive unit as claimed in claim 9, wherein said peripheral channel-shaped groove is provided on said gear case and said peripheral web is provided on said gear case cover.

11. The motor-gear drive unit as claimed in claim 8, wherein said peripheral channel-shared groove is molded into said gear case, which consists essentially of plastic, and said peripheral web is molded onto said gear case cover, which is formed essentially of plastic.

12. A motor-gear drive unit, comprising:

a gear case; and a gear case cover for closing said gear case in a moisture-tight manner, wherein said gear case cover is fashioned to connect to said gear case nonpositively by means of a press-fit, clamp-fastening closure provided by a peripheral web inserted into a peripheral channel-shaped groove, said peripheral web and said peripheral channel-shaped groove being provided, respectively, on one and the other of said gear case and said gear case cover, and wherein said gear case cover has a central insertion orifice for an output shaft and comprises an elastic dynamic sealing lip in a region of the insertion orifice, for sealing said gear case cover relative to the output shaft.

13. The motor-gear drive unit as claimed in claim 12, wherein said elastic dynamic sealing lip is a vulcanized or injection-molded sealing lip on said gear case cover.

14. The motor-gear drive unit as claimed in claim 12, wherein:

said gear case cover has a peripheral static sealing edge having a wedge-shaped cross-section widening with increasing depth of insertion and extending along said peripheral web, and said peripheral static sealing edge and said dynamic sealing lip are connected as a unitary piece to a sealing layer covering an outer end face of the gear case cover.

15. A gear case arrangement, comprising:

a gear case;

a gear case cover; and a moisture-tight seal between said gear case and said gear case cover;

wherein said moisture-tight seal comprises:
a peripheral groove and
a peripheral ridge corresponding to said groove and mating with said groove by being pressed into and held securely within said groove through frictional and elastic forces between said ridge and said groove; and wherein said peripheral ridge comprises a laterally projecting, peripheral rib running along at least part of said ridge, said peripheral rib pressing against a side wall of said groove.

16. The gear case arrangement as claimed in claim 15, wherein:

said peripheral groove is provided at a rim of said gear case, and said peripheral ridge is provided at a rim of said gear case cover.

17. The gear case arrangement as claimed in claim 15, wherein:

said groove has a radially inward-facing outer side wall and has a radially outward-facing inner side wall, and said peripheral rib projects laterally inward and presses against the inner side wall of said groove.

18. A gear case arrangement, comprising:

a gear case;

a gear case cover; and a moisture-tight seal between said gear case and said gear case cover;

wherein said moisture-tight seal comprises:
a peripheral groove and
a peripheral ridge corresponding to said groove and mating with said groove by being pressed into and held securely within said groove through frictional and elastic forces between said ridge and said groove; and wherein said peripheral ridge comprises a gasket layer running along at least a part of said ridge, said gasket layer pressing against a side wall of said groove.

19. The gear case arrangement as claimed in claim 18, wherein:

said groove has a radially inward-facing outer side wall and has a radially outward-facing inner side wall, and said gasket layer presses against the outer side wall of said groove.

* * * * *